(12) United States Patent
Rubesa et al.

(10) Patent No.: US 12,185,742 B2
(45) Date of Patent: *Jan. 7, 2025

(54) SEAWEED EXTRACT

(71) Applicant: Conopco Inc., Englewood Cliffs, NJ (US)

(72) Inventors: Tino Rubesa, Wageningen (NL); Kok-Kin Chan, Wageningen (NL); Evert Vermandel, Wageningen (NL); Johannes Maria Baptist Matthee, Wageningen (NL); Anne Zantinge, Wageningen (NL)

(73) Assignee: Conopco Inc., Englewood Cliffs, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/264,762

(22) PCT Filed: Feb. 17, 2022

(86) PCT No.: PCT/EP2022/053867
§ 371 (c)(1),
(2) Date: Aug. 9, 2023

(87) PCT Pub. No.: WO2022/175354
PCT Pub. Date: Aug. 25, 2022

(65) Prior Publication Data
US 2024/0032575 A1 Feb. 1, 2024

(30) Foreign Application Priority Data
Feb. 19, 2021 (EP) ..................... 21158186

(51) Int. Cl.
*A23L 2/02* (2006.01)
*A23L 17/60* (2016.01)
*A23L 27/00* (2016.01)
*A23L 27/10* (2016.01)

(52) U.S. Cl.
CPC .............. *A23L 27/10* (2016.08); *A23L 17/60* (2016.08); *A23L 27/88* (2016.08)

(58) Field of Classification Search
CPC ........... A23L 27/10; A23L 27/88; A23L 17/60
USPC ....................................................... 426/534
See application file for complete search history.

(56) References Cited

FOREIGN PATENT DOCUMENTS

| CA | 127938 A | 9/1910 | | |
|---|---|---|---|---|
| CN | 1593239 | 3/2005 | | |
| CN | 1964635 | 5/2007 | | |
| CN | 101791132 | 8/2010 | | |
| CN | 102481005 | 5/2012 | | |
| CN | 104010523 | 8/2014 | | |
| CN | 109198572 | 1/2019 | | |
| EP | 1344459 A1 | 9/2003 | | |
| EP | 2793616 B1 | 1/2018 | | |
| JP | 2009225791 | 10/2009 | | |
| JP | 2009297014 | 12/2009 | | |
| JP | 2013017432 | 1/2013 | | |
| JP | 2020048527 | 4/2020 | | |
| KR | 880007006 A | 9/1988 | | |
| KR | 900000028 A | 1/1990 | | |
| KR | 20210133354 | 11/2021 | | |
| KR | 20210141338 | 11/2021 | | |
| PH | 2020000367 | 2/2022 | | |
| RU | 2650808 C1 * | 4/2018 | ............. | A61K 36/03 |
| WO | WO2009051470 | 4/2009 | | |
| WO | 2021118211 | 6/2021 | | |
| WO | 2021221520 | 11/2021 | | |
| WO | 2022115837 | 6/2022 | | |

OTHER PUBLICATIONS

Mouritsen et al., Seaweeds for umami flavour in the New Nordic Cuisine, Flavour. (Year: 2012).*
Mouritsen et al., Umami taste, free amino acid composition, and volatile compounds of brown seaweeds, Journal of Applied Phycology. (Year: 2019).*
Translation of RU-2650808-C1 (Year: 2018).*
Moerdijk-Poortvliet, Tanja C.W. et al.; "Extraction and analysis of free amino acids and 5'-nucleotides, the key contributors to the umami taste of seaweed"; Occt. 7, 2021; https://doi.org/10.1016/.foodchem.2021.131352; Food Chemistry 370 (2022) 131352; Elsevier.
Lafeuille, Betina et al; "Impact of temperature and cooking time on the physicochemical properties and sensory potential of seaweed water extracts of Palmaria palmata and Saccharina longicruris"; Apr. 13, 2022; Journal of Applied Phycology (2022), 1731-1747; 34; Springer.
Coleman, Bert et al.; "Potential of microalgae as flavoring agents for plant-based seafood alternatives"; Mar. 27, 2022; Future Foods 5; Elsevier.
Yuasa et al; Characterization of flavor component in Japanese instant soup stocks dashi; International Journal of Gastronomy and Food Science; vol. 9; pp. 55-61; 2017; 2017; 55-61.

* cited by examiner

Primary Examiner — Brent T O'Hern
(74) Attorney, Agent, or Firm — N.V. Nederlandsch Octrooibureau

(57) ABSTRACT

A savoury flavour concentrate from seaweed provides for umami and meaty notes when added to savoury food product. The concentrate can be used for the preparation of flavour products or can be added as such. Also described is a process for the preparation of the concentrate from seaweed by boiling seaweed, removing it from the boiling water, and further concentrating the remaining liquid.

7 Claims, No Drawings

SEAWEED EXTRACT

FIELD OF THE INVENTION

The invention relates to a flavour composition having an umami flavour obtained from seaweed. In particular, the invention relates to a flavour composition containing umami and/or meaty notes for application in food products. The present invention also relates to a method for the manufacturing of the seaweed-based composition.

BACKGROUND OF THE INVENTION

Flavoring systems are of vital importance in savory food manufacturing. Many industrially prepared foods are particularly attractive to potential consumers primarily because of their typical flavours. Therefore, it is no surprise that the food industry dealing with these product segments shows great interest in the use of food or food ingredients carrying the typical umami taste and flavor enhancement systems. One of the main concerns of manufacturers of savory food is how to provide the consumer with tasty foods while complying with increasingly severe local legal constraints concerning the use of many potent flavoring systems.

Various natural and unnatural compositions and/or compounds have been added to foods, beverages, and/or comestible (edible) compositions to improve their taste. One of the five known basic tastes is the "savoury" or "umami" flavour of monosodium glutamate ("MSG"), which is now commonly added to many food and beverage compositions to desirably improve their "savoury" flavor. Umami describes the savouriness, deliciousness or succulence of a food and is considered by many to represent a fifth taste dimension.

The consumer perception of added MSG is generally negative in some countries, especially Germany, France and the US. There is therefore a need for alternative solutions to the problem of delivering umami flavour providers or enhancers.

Flavour compositions obtained from natural sources have been described in the art. In EP2793616 a flavour composition having an umami flavour obtained from the blanching or cooking water of vegetables is described.

EP1344459 describes a seasoning composition useful for imparting umami taste to food products comprising a mixture of nucleotide and organic acids or salts thereof.

The processes described are often difficult and the salts for the umami flavour of limited availability to the industry.

In the past, food products using seaweed an ingredient have been described. In KR19900000028 a health food from seaweed is described. In KR19880007006 the preparation of a food product from seaweed is described, comprising the steps of boiling, drying and pulverizing seaweed; and mixing the pulverized powder with vegetative powder such as cereals, fruit, and medicinal herb.

One of the main concerns of manufacturers of savory food is how to provide the consumer with tasty foods while complying with increasingly severe local legal constraints concerning the use of many potent flavoring systems.

Hence, there is still a need for vegetable based, natural ingredients only containing flavour compositions, providing an umami and/or meaty notes containing composition. Also, there is a need for a simple process of obtaining such flavour compositions, without the addition of ingredients which are not directly obtained from natural sources. It is highly desirable to reduce the environmental footprint.

The flavour composition of the invention allows the preparation of fully vegan savoury food products without the need to compromise on the rounded meaty and umami flavour notes.

SUMMARY OF THE INVENTION

The invention relates to a flavour composition having umami and/or meaty flavour notes, obtained from seaweed.

In one embodiment, the invention relates to a flavour composition containing a seaweed concentrate or product derived therefrom comprising glutamate and at least one of AMP, CMP, GMP and UMP.

In another embodiment of the invention, the invention relates to process for the preparation of a flavour composition obtained by boiling seaweed in a water containing liquid for at least 30 minutes, removing the seaweed from this liquid, and further concentrating the remaining liquid.

The invention also provides a process for preparing a flavour composition, the process comprising the steps of:
  a. heating a seaweed species selected from the group of *Fucus serratus* and/or *Codium tomentosum* in an amount of water to a temperature in the range of 80 degrees Celsius to boiling temperature;
  b. simmering the seaweed in this water for a period in the range of 30 to minutes;
  c. separating the seaweed from the water, and
  d. concentrating the remaining water by evaporation and/or reduction until 50 vol. % or less of the water remains.

In a further aspect of the invention there is provided a flavour composition prepared by the process of the invention.

The flavour compositions of the invention are suitably applied to savoury food products and will enhance the umami taste perception. By the process of this invention the flavour products obtained can provide umami taste with meaty notes to savoury products. The process allows for the use of from natural ingredients only, and therefore provides a great advantage in present times with a need for natural ingredients is increasing. The process allows for flavour compositions of natural ingredients without the need of the addition of any composition that needs undesired labelling of the products it is used in.

DETAILED DESCRIPTION OF THE INVENTION

Definitions

As used herein the term "comprising" encompasses the terms "consisting essentially of" and "consisting of". Where the term "comprising" is used, the listed steps or options need not be exhaustive.

Unless otherwise specified, numerical ranges expressed in the format "from x to y" are understood to include x and y.

In specifying any range of values or amounts, any particular upper value or amount can be associated with any particular lower value or amount.

Except in the examples and comparative experiments, or where otherwise explicitly indicated, all numbers are to be understood as modified by the word "about".

All percentages and ratios contained herein are calculated by weight unless otherwise indicated.

As used herein, the indefinite article "a" or "an" and its corresponding definite article "the" means at least one, or one or more, unless specified otherwise.

The various features of the present invention referred to in individual sections above apply, as appropriate, to other sections mutatis mutandis. Consequently features specified in one section may be combined with features specified in other sections as appropriate. Any section headings are added for convenience only, and are not intended to limit the disclosure in any way.

In this specification, the words concentrate and extract are used interexchangeably.

Flavour Compositions

The invention relates to a flavour composition containing a seaweed concentrate or product derived therefrom comprising glutamate and at least two of AMP, CMP, GMP and UMP. The invention further provides for a flavour composition containing a seaweed concentrate or products derived therefrom, wherein at least part of the, and preferably all of the glutamate and the at least two of AMP, CMP, GMP and UMP are obtained from seaweed. Suitably, these can be obtained from the seaweed by the boiling process as described herein. It is believed that the presence of at least two of those ribonucleotides provide a significant enhancement to the umami flavour obtained from glutamate, and in particular enhances or even introduces the presence of the meaty notes in the obtained boiling liquid flavour, especially in the concentrate obtained therefrom.

It was found that the flavour products of the invention to not only have umami flavour notes, but in addition can also provide meaty flavour notes to a savoury product that the flavour product is added to. One of the main ingredients adding savoury is MSG, monosodium glutamate. The products of the invention to not only contain a sufficient amount of MSG, but also contains ribonucleotides and nucleotides that both enhance and further increase the umami and meaty flavour notes perception of the product of the invention. It has been found that, in addition to MSG, the flavour products of the invention further contain at least two of AMP, CMP, GMP and UMP. These components are believed to contribute to the meaty flavour notes present in combination with umami flavour enhancement obtained by the presence of MSG. In a preferred embodiment, at least three of those ribonucleotides and nucleotides are present in addition to MSG. In a further preferred embodiment, all 4 are present.

Thus, in a highly preferred embodiment the product of the invention contains a seaweed concentrate comprising glutamate and AMP, CMP, GMP, UMP.

This flavour product obtainable from seaweed, in particular from *Fucus serratus*, is in particular suitable for any of the flavour products described in this specification. Therefore, in a preferred embodiment the invention relates to a flavour composition containing a seaweed concentrate or product derived therefrom comprising glutamate and at least one of AMP, CMP, GMP and UMP, and wherein the seaweed concentrate is obtained from *Fucus serratus*. In a further preferred embodiment, the invention relates to a flavour composition containing a seaweed concentrate or product derived therefrom comprising glutamate and at least two or more of AMP, CMP, GMP and UMP, and wherein the seaweed concentrate is obtained from *Fucus serratus*.

It has been found that these ribonucleotides are present in seaweed. in particular in *Fucus serratus*, Thus, the invention further provides for a flavour composition containing a seaweed concentrate or products derived therefrom, wherein the glutamate and the at least two of AMP, CMP, GMP and UMP are obtained from seaweed. In a further preferred embodiment, the at least two or more of AMP, CMP, GMP and UMP are obtained from *Fucus serratus*. Suitably, these can be obtained from the seaweed by the boiling process as described herein.

The 4 ribonucleotides (ribonucleoside 5'-monophosphate) referred to are

| Nucleotide | Symbols |
|---|---|
| Adenylate (adenosine 5'-monophosphate) | AMP |
| Guanylate (guanosine 5'-monophosphate) | GMP |
| Uridylate (uridine 5'-monophosphate) | UMP |
| Cytidylate (cytidine 5'-monophosphate) | CMP |

In a further aspect of the invention, there is provided a flavour composition having umami flavour notes obtained from seaweed. The invention further provides a flavour composition having mushroom and/or crustacea flavour notes. These are in particular found by boiling one or more seaweed species selected from the group of *Fucus serratus, Fucus vesiculosus* and *Fucus spiralis, Codium tomentosum, Palmaria palmatain, Ulva lactuca, Porphyra umbilicalis, Gracilaria gracilis*, and mixtures thereof. Favourable flavour notes are found in *Fucus serratus* and *Codium tomentosum*, and most preferred a flavour notes found in *Fucus serratus*.

Seaweed

Whereas the use of seaweed is known for a long time limit on a great variety of applications, such as human food, plant stimulants, bioenergy, livestock feed, and as raw material for example for plastics, the use as a flavour component as such has not been proposed before.

Seaweeds are plant-like organisms that generally live attached to rock or other hard substrata in marine environments. Seaweeds may be microscopic such as microalgae but also enormous such as giant kelp that grows in "forests" and tower like underwater woods from their holdfasts at the bottom of the sea. Most of the seaweed species are either green (more than 6500 species), brown (about 2000 species), or red (about 7000 species) kinds.

*Fucus serratus* is currently used for the production of cosmetics and for thalassotherapy, and in particular for use as a liquid fertiliser. It has now been found that this particular seaweed can provide for a flavour composition providing umami taste without the need of any further addition of taste enhancers.

In one embodiment of the invention, the edible seaweed species is selected from the group of *Fucus, Codium, Palmaria palmatain, Ulva lactuca, Porphyra umbilicalis, Gracilaria gracilis*, and mixtures thereof. In a preferred embodiment, the edible seaweed species is selected from *Fucus serratus, Fucus vesiculosus* and *Fucus spiralis*, or *Codium tomentosum*.

It was found that in particular the use of *Fucus serratus* provides a desirable flavour concentrate having umami and/or meaty notes. In particular, good flavour results with umami and meaty/beefy notes was obtained from seaweed species of the *Fucus serratus*. By combining different seaweeds, a flavour composition with flavour notes from the different starting species can be obtained. By the presence of further flavour releasing ingredients such as such as vegetables the flavour of the flavour composition can be adapted to particular needs.

The seaweed applied preferably is seaweed which has not been processed or dried prior to its use in the process of the invention. Thereby, the flavour obtained from fresh seaweed being applied provides the best flavour components. However for practical work convenience, also dried seaweed can be applied. Dried seaweed that is suitable for a process of the invention can be obtained by drying in any process known to the man skilled in the art. In this specification, the amount of seaweed indicated refers to fresh seaweed. Where dried seaweed is applied, an amount equivalent to the amount of fresh seaweed it is obtained from is to be used.

Process

The invention further concerns process for the preparation of a flavour composition, comprising the steps of
a. heating a seaweed and water containing liquid to boiling temperature;
b. simmering the seaweed containing liquid for at least 30 minutes,
c. removing the seaweed from the liquid, and
d. concentrating the remaining liquid.

In a preferred embodiment of this process, the seaweed is simmered at a temperature in the range of 80 to 100° C. for 30 to 90 minutes. The amount of water is to be chosen such that good extraction of the flavour components into the water, can occur. For example, the volume amount of water is at least three times that of the seaweed, and preferably at least six times the volume amount of the seaweed. This process allows for adding further flavour delivering components such as vegetables in the boiling step of this process. For industrial application of the process, it is highly preferred that that the liquid that is boiled consists of seaweed and water, although, optionally other flavour components can be present.

In another aspect of the invention, there is provided for a process for preparing a flavour composition, the process comprising the steps of:
a. heating a seaweed species selected from the group of *Fucus serratus* and/or *Codium tomentosum* in an amount of water to a temperature in the range of 80 degrees Celsius to boiling temperature, the volume amount of water to seaweed being at least 3:1;
b. simmering the seaweed in this water for a period in the range of 30 to 90 minutes;
c. separating the seaweed from the water, and
d. concentrating the remaining water by evaporation and/or reduction until 50 vol. % or less of the water remains.

It has been observed that the liquid from the boiling process contains glutamate and at least two or more of AMP, CMP, GMP and UMP. By applying this boiling process to a seaweed species selected from the group of *Fucus serratus*, a flavour composition containing glutamate and at least three or more of AMP, CMP, GMP and UMP is obtained. The boiling water so obtained, in particular, the further concentrated composition provides an enhanced umami flavour having meaty/beefy notes. Such liquid concentrate is highly suitable as a flavour composition to provide a savoury flavour having meaty/beefy notes to a food product. Such concentrate is suitable for providing a meaty or even meaty/beefy savoury flavour to vegetarian or vegan labelled products.

Suitably, the seaweed species is rinsed to remove undesired ingredients such as sand and further undesired contaminants prior heating the seaweed in the liquid.

In a preferred embodiment, the invention provides for a process for a method for preparing a flavour composition having a savoury flavour, the process comprising the steps of:
a) heating edible seaweed species selected from the group of *Fucus serratus* in an amount of water to a temperature in the range of 80 degrees Celsius to boiling temperature, the volume amount of water to seaweed being at least 3:1,
b) simmering the seaweed in this water for a period in the range of 30 to 75 minutes;
c) separating the seaweed from the water;
d) concentrating the remaining water by evaporation and/or reduction until 40 vol. % or less of the water remains.

In a further preferred embodiment, the remaining water of step d) is concentrated until less than 35 vol. % of the liquid remains. The evaporation and/or reduction can be carried out by any method known in the art. This concentration is carried out until a desired concentration is obtained and can range from dry to a certain concentrated liquid.

The seaweed is simmered in its boiling liquid for period of time in the range of 30 to 90 minutes, preferably at least 35, further preferred 40 or even 45 minutes, where it is recommended to simmer the seaweed not too long to avoid the flavour components to break down. It is recommended to simmer the seaweed for a maximum period of 90 minutes, although simmering for a period longer than 75 minutes is considered not to contribute significantly to the release of the flavour components from the seaweed into the boiling liquid. Therefore, a process in which the seaweed is simmered for a period of less than 75 minutes is proposed. It was found that simmering for up to 60 minutes, preferably less than 55, and further preferred less than 50 minutes provides for a good balance of processing time and flavour components release.

During the boiling step of the process, taste active ingredients dissolve in the cooking water. It was found that also at slightly lower temperatures the flavour components will be solved in the boiling liquid, for example by blanching. The boiling process can be carried out in an open vessel, although the boiling temperature can be reduced by working under vacuum. By the further step of concentration for example through evaporation and/or reduction the flavour active substances of the seaweed will be concentrated to form a concentration that can be used directly, or further processed to a format of convenience for food manufacturing.

The temperature of this boiling step will depend on other parameters applied in this process step. For example, by applying pressure the temperature required for boiling the liquid will be less. Instead of boiling, also a temperature just below the boiling point can be applied. The temperature and/or time of simmering applied is to be chosen such that the flavour components in the seaweed will extract into the liquid. Times and temperatures preferably are chosen from the guidance provided herein.

The process described will provide a concentrate flavour product from seaweed comprising glutamate and at least one of AMP, CMP, GMP and UMP. Such concentrate flavour product can be used for the production of a flavour composition. Preferably, the flavour composition obtained by the process described comprises glutamate and at least two of AMP, CMP, GMP and UMP, more preferred at least three and most preferred all four of AMP, CMP, GMP and UMP.

The concentrate can either directly act as an umami provider or act as side player to enhance the umami perception of the natural MSG already present. There is also a significant advantage in providing a strong umami flavour without the addition of MSG or any other flavour ingredient or flavour enhancing ingredient. This allows also for green products labelling.

The concentrate obtained by the process of the invention can be further processed into formats finding practical use in the manufacturing of savoury foods. For example, by spray drying of the concentrate obtained by the process of the current invention, a powder or granulate composition can be obtained. If so desired, the liquid concentrate, powder or granulate composition can be further processed into a paste, tablet or cube.

The flavour composition of the invention can be used as liquid and/or powder in savoury and/or dressings products like bouillons, soups, sauces, seasonings, condiments, meat analogs and/or meat extender and/or meat substitute, vinaigrettes and salad dressings.

The products of the invention so allow for the preparation of the vegetarian products having a meaty and/or umami taste, and still can have the label of the product being prepared from natural products only.

The flavour products can also be used in combination with other flavour components so as to obtain a flavour product designed for a particular need.

For example, the flavour products can be combined with the flavour components of plant based materials such as vegetables and fruits, mushrooms, pulses or grains. Flavour components that can enhance the preparation like yeast extracts and/or plant extracts and/or additives can also be combined with the flavour products of the invention.

EXAMPLES

The examples are intended to illustrate the invention and are not intended to limit the invention to those examples per se.

Example 1

A liquid extract was prepared from 1 kg of fresh *Fucus Serratus*. Thereto, 1 kg of fresh *Fucus Serratus* was rinsed three times with fresh water and left to stand for 10 minutes. This was then added to 6 L of water and heated to boiling temperature. This was left to simmer at this temperature for about 45 minutes. In the next step, the seaweed was separated from the so obtained bouillon.

4.5 litres of this so obtained bouillon was further reduced to about 1.5 L. and analysed. Thereto, a tasting panel of 10 trained tasting experts evaluated the outcome of the preparation and described attributes.

Visual observation showed a light brown to reddish color. The products had the smell of umami notes with a beef bloody direction; and tasting by the panel was described as umami/beefy taste with minor crustacea undertone noted.

The concentrate was analysed by NMR, the results are indicated in table 1.

TABLE 1

| ingredient | Average amount (mg/g) |
| --- | --- |
| AMP | 0.03 |
| CMP | 0.01 |
| Glutamate | 0.70 |
| GMP | 0.01 |
| UMP | 0.03 |

Example 2

1 kg of Seaweed *Codium tomentosum* was processed as described for Example 1, and analysed by the expert panel.

After cooling down, the liquid showed a light yellow to green colour, the smell was described as low aroma. The expert panel tasting results were indicated as green leaves to spinach, light herby.

After reduction to 1½ L. the product was tested by the expert panel. The colour was described as a light yellow to green, the smell was described as sweet/salty bitter stringent taste.

Example 3

1 kg of fresh *Fucus Serratus* was rinsed three times with fresh water and left to stand for minutes. The seaweed was placed on trays and dried by hot air till the water content was about 60 g. 6 L of water was added to the dried seaweed. This was then brought to boiling temperature and left to simmer for about 45 minutes. The seaweed was removed from the water, and 4.5 litres of this so obtained bouillon was further reduced to about 1.5 litres and analysed.

Observation, smelling and tasting resulted in the observation that the colour of the remaining composition was light brown to reddish, whereas the smell and taste where described as for the fresh seaweed example 1, but more intense.

Example 4

Example 3 was repeated with *Codium tomentosum* instead of *Fucus Serratus* and analysed by the tasting panel. Observation, smelling and tasting showed that the colour of the remaining composition was olive green, the aroma was described as seaweed ocean green leaves, and the taste was described as having light salty green leaves with crustaceans and minor shrimp flavour notes.

For both example 3 and example 4, the taste was appreciated as more intense than when prepared from the fresh seaweed.

Example 5

1 kg of Seaweed *Ulva lactuca* was processed as described for Example 1, and analysed by the expert panel.

After cooling down, the liquid showed a light yellow to green colour, the smell was described as slightly crustascease. The expert panel tasting results were indicated as slightly sweet, light ocean greens with hints of lobster/crab.

After reduction to 1½ L. the product was tested by the expert panel. The colour was described as green to yellow turbid, the smell was described as Brussels sprouts. The expert panel tasting results were described as overcooked cabbage.

For this seaweed, the boiling liquid concentrate is suitable applicable as such, whereas the concentrate is highly suitable in combination with other seaweeds or flavour ingredients.

The invention claimed is:

1. A flavour composition containing a seaweed concentrate or product derived from the seaweed concentrate comprising glutamate and at least two ribonucleotides of AMP, CMP, GMP and UMP.

2. The flavor composition containing a seaweed concentrate or product derived from the seaweed concentrate according to claim 1, comprising the glutamate and at least 3 of the AMP, CMP, GMP and UMP.

3. The flavour composition containing a seaweed concentrate or product derived from the seaweed concentrate according to claim 2, comprising glutamate and the AMP, CMP, GMP and UMP.

4. The flavour composition according to claim 1, wherein at least part of the glutamate and the AMP, CMP, GMP and UMP present are obtained from seaweed.

5. The flavour composition according to claim 4, wherein the flavour composition is the seaweed concentrate.

6. The flavour composition according to claim 1, wherein the glutamate and the at least two ribonucleotides of AMP, CMP, GMP and UMP are derived from seaweed.

7. The flavour composition according to claim 6, wherein the glutamate and the at least two ribonucleotides of AMP, CMP, GMP and UMP are derived from *Fucus serratus*.

\* \* \* \* \*